(12) United States Patent
Hansen

(10) Patent No.: US 9,868,575 B2
(45) Date of Patent: Jan. 16, 2018

(54) FLEXIBLE LAMINATE HAVING AN INTEGRATED PRESSURE-RELEASE VALVE

(71) Applicant: Amcor Flexibles Denmark APS, Horsens (DK)

(72) Inventor: Peter Hansen, Vejle Oest (DK)

(73) Assignee: Amcor Flexibles Denmark ApS, Horsens (DK)

( * ) Notice: Subject to any disclaimer, the term of this patent is extended or adjusted under 35 U.S.C. 154(b) by 0 days.

(21) Appl. No.: 15/507,353

(22) PCT Filed: Jul. 10, 2015

(86) PCT No.: PCT/EP2015/065853
§ 371 (c)(1),
(2) Date: Feb. 28, 2017

(87) PCT Pub. No.: WO2016/030071
PCT Pub. Date: Mar. 3, 2016

(65) Prior Publication Data
US 2017/0247159 A1    Aug. 31, 2017

(30) Foreign Application Priority Data

Aug. 29, 2014    (EP) .................................... 14182888

(51) Int. Cl.
*B65D 77/22*    (2006.01)
*B32B 3/08*    (2006.01)
(Continued)

(52) U.S. Cl.
CPC .............. *B65D 77/225* (2013.01); *B32B 3/08* (2013.01); *B32B 3/266* (2013.01); *B32B 7/14* (2013.01);
(Continued)

(58) Field of Classification Search
CPC .... B65D 77/225; B65D 2205/00; B32B 3/08; B32B 3/266; B32B 7/14; B32B 27/08; B32B 37/1292; B32B 38/04; B32B 38/0004; B32B 2255/10; B32B 2307/514; B32B 2307/7244; B32B 2439/70; B32B 2038/047
See application file for complete search history.

(56) References Cited

U.S. PATENT DOCUMENTS 5,263,777 A    11/1993 Domke
5,326,176 A    7/1994 Domke
(Continued)

FOREIGN PATENT DOCUMENTS

EP    0 144 011 B2    12/1992
EP    0 559 598 B1    6/1996
(Continued)

*Primary Examiner* — Michael C Miggins
(74) *Attorney, Agent, or Firm* — Reinhart Boerner Van Deuren P.C.

(57) ABSTRACT

The present invention is related to flexible multilayer laminates having an integrated, one-way pressure-release valve for use in a sealed container for packing gas-producing products. The pressure-release valve is partly disconnected from the rest of the laminate, forming an inflatable outlet tube with at least one large outlet opening and lifting off from the laminate under increased pressure in the pack. The one-way pressure-release valve allows for pressure release at low minimum opening pressure in a reliable and reproducible way.

14 Claims, 12 Drawing Sheets

(51) Int. Cl.
  *B32B 3/26*  (2006.01)
  *B32B 7/14*  (2006.01)
  *B32B 27/08* (2006.01)
  *B32B 37/12* (2006.01)
  *B32B 38/04* (2006.01)
  *B32B 38/00* (2006.01)

(52) U.S. Cl.
  CPC .......... *B32B 27/08* (2013.01); *B32B 37/1292* (2013.01); *B32B 38/0004* (2013.01); *B32B 38/04* (2013.01); *B32B 2038/047* (2013.01); *B32B 2255/10* (2013.01); *B32B 2307/514* (2013.01); *B32B 2307/7244* (2013.01); *B32B 2439/70* (2013.01); *B65D 2205/00* (2013.01)

(56) References Cited

U.S. PATENT DOCUMENTS

| | | |
|---|---|---|
| 7,527,840 B2 | 5/2009 | Zeik |
| 7,892,390 B2 | 2/2011 | Zeik |
| 8,557,357 B2 | 10/2013 | Lykke et al. |

FOREIGN PATENT DOCUMENTS

| | | |
|---|---|---|
| WO | WO 2006/012282 A1 | 2/2006 |
| WO | WO 2013/162636 A1 | 10/2013 |
| WO | WO 2014/055736 A1 | 4/2014 |

FLEXIBLE LAMINATE HAVING AN INTEGRATED PRESSURE-RELEASE VALVE

FIELD OF THE INVENTION

The present invention is related to flexible multilayer laminates having an integrated, one-way pressure-release valve to be used in a sealed container for packing gas-producing products.

STATE OF THE ART

In today's market, many products are packaged in sealed containers using vacuum packing because the product is oxygen-sensitive and will degrade when exposed to oxygen. Common examples of oxygen-sensitive products that use a vacuum-packed container include coffee and dairy products.

Products containing gases or producing off-gasses for a period of time such as coffee after roasting must be degassed before they are packed. If packed before or during the degassing period, the gasses generated can increase the internal pressure of the package so that the sealed package may deform or even burst. Additional facilities are thus required for degassing the product before it is packed. For example, six to eight hours may be needed for degassing ground coffee so that it can be conventionally packed. Besides the fact that degassing coffee, before packing, is not favourable from an economical point of view, it will also influence the quality of the coffee.

In order to skip the degassing step and to preserve the quality of the coffee, the use of a one-way valve incorporated in the sealed package structure has been proposed. An advantage of packaging with a one-way valve is that overpressure issues can be avoided since the valve will vent away positive pressure differentials. In case of a negative pressure difference—the internal pressure is lower than the external pressure—the one-way valve that prevents the back flow of air into the package must be able to withstand this internal vacuum without failing to prevent the ingress of oxygen that may potentially damage the contents. By means of a venting valve, the deficiencies of vacuum packing can be avoided.

One-way valves integrated in the flexible package structure have already been the subject matter of a certain number of patents.

EP 0 144 011 B1 (Raackmanns Fabriker A/S '83) discloses a laminate for the manufacture of a packing with a valve, such as a bag of a laminate welded along the bottom and back rims and in the filled state along the top rim, characterized in that the outer layer of the laminate is laminated to the adjacent, internally positioned layer, substantially over the entire extension of the laminate, a limited area being however not laminated and communicating with the surroundings of the finished packing, and in that a perforation is provided within the non-laminated area through the remaining inner laminate layer, said perforation being placed to form an open connection between the interior and the non-laminated area of the finished packing.

U.S. Pat. Nos. 5,263,777 and 5,326,176 (Robert Bosch GmbH '91) disclose a one-way valve comprising adhesive strips adhering a thin flexible membrane to the package wall, having the advantage that when the valve is closed, the elastic valve membrane rests sealingly on the congruent part of the package wall having a plurality of holes. The thick peripheral part of the adhesive strips also has the effect that one wall of an adjacent package in a collective package is supported on the raised peripheral zones of the membrane, which act as spacers, so that if overpressure occurs in the package, the adhesive-free centre zone can freely bulge outward, forming a channel, thus making the overpressure valve functional. These advantages are still more pronounced if the adhesive strips have regions of slight inclination.

EP 0 559 598 B1 (Danapak Holding A/S '92) discloses a foil comprising a valve for the packing of gas-emitting products, which foil consists of an inner layer and of an outer layer in which perforations are made, the perforations of the one layer being staggered in relation to the perforations of the other layer, characterized in that the inner layer and the outer layer are glued together substantially over the entire foil with the exception of limited sections that are left un-laminated for the formation of a pocket between the layers and where the perforations extend into said pocket.

U.S. Pat. No. 8,557,357 (Amcor Flexibles Transpac B.V.B.A '09) discloses a packaging material for packing gas-releasing products and being provided with an integral, normally closed pressure-release valve including a first inner film having at least one inlet opening, and a second outer film covering the inlet opening in the first inner film and being bonded to the first inner film to form a channel portion between the first inner film and the second outer film, said channel or pocket portion communicating with the surroundings of the package through at least one outlet opening spaced apart from the inlet opening. The pressure-release valve further comprises a liquid and solid spacer means provided in the channel portion proximate to the inlet opening. The spacer means provide an interspace between the first inner film and the second outer film. The second outer film is a film having such an elasticity that in a tensile test, a force of less than 5N is needed for elongating a test piece thereof having a width of 15 mm by 5%.

U.S. Pat. No. 7,527,840 (The Folger Coffee Company '04) discloses a multi-layered flexible laminate having an integrated pressure-release valve comprising:
a) a first laminate having at least one inlet channel;
b) a second laminate having at least one outlet channel;
c) the first and second laminates at least partially bonded to one another about an un-bonded valve region having open and closed orientations and having a liquid film disposed therein;
d) particles mixed with the liquid film at a location proximate to the inlet channel wherein the inlet and outlet channels preferentially permit gaseous communication in one direction within the valve region when the valve region is in the open orientation.

U.S. Pat. No. 7,892,390 (The Folger Coffee Company '04) discloses a process for making a laminate having an integrated pressure-release valve, the process comprising the steps of:
a) providing a first laminate with an inlet channel passing through it;
b) applying a liquid film to the first laminate; and
c) joining a second laminate to the first laminate, the second laminate having an outlet channel passing through the second laminate, wherein the inlet channel of the first laminate and the outlet channel of the second laminate are both in gaseous communication with the liquid film.

WO 2013/162636 (Avery Dennison Corporation '12) discloses a multilayer one-way valve including a first layer having at least one opening formed therein; a second layer having at least one opening formed therein and a third layer. The first and the second layers are joined together such that at least one channel is defined there between, and the second and the third layers are joined together such that at least one second channel is defined there between. Additionally, an amount of flowable liquid is deposited in the first channel between the first and second openings. Suitably, the valve selectively opens to permit gas flow through the first and second channels in response to a pressure differential, the rate of gas flow through the valve is exponentially proportional to the pressure differential.

WO 2014/055736 (CCL Label, Inc. '12) discloses a one-way valve including a first layer having at least one first opening formed therein and a second layer. The first and second layers are joined together such that at least one channel is defined there between, which channel selectively permits gas flow from the first opening out of the valve. In operation, the valve selectively opens to permit gas flow through the channel in response to a pressure differential on opposing sides of the valve, wherein the pressure differential sufficient to dynamically open the valve varies over time. Suitably, a material is arranged in the channel which experiences a change that precipitates the dynamic variation of the pressure differential to open the valve.

The one-way pressure-release valves as disclosed in prior art documents all suffer from shortcomings with regard to:
- their reliability during the life cycle of the packaging, i.e. venting away positive pressure differentials and preventing the ingress of air because of negative pressure differentials, and
- their output capacity, which is insufficient for the packaging of products with an important off-gassing flow rate, such as for example ground coffee being packed immediately after being ground, i.e during the initial phase of its degassing.

These shortcomings are in general attributed to the design of said one-way valve, to the type of polymers of the respective layers composing the laminate and to stresses occurring in the laminate due to pressure differentials and/or mechanical deformation of the laminate.

AIMS OF THE INVENTION

The present invention aims to provide a flexible laminate including an integral, one-way pressure-release valve with reliable and reproducible low opening pressure and high output capacity during the entire life of the packaging.

A further aim of the present invention is to provide a method for the manufacturing of said flexible laminate including said integral, one-way pressure-release valve.

SUMMARY OF THE INVENTION

The present invention discloses a flexible multilayer laminate for forming a packaging of gas-releasing products, said laminate having an integrated pressure-release valve having open and closed orientations and having a liquid film disposed therein, the liquid film optionally comprising spacer means, said flexible multilayer laminate comprising:
  a laminate comprising a first, oriented polymer layer sealed on an underlying layer comprising a seal layer, by a first adhesive pattern comprising first adhesive-free regions located on at least both sides of, or around at least one inlet perforation and a second perforation-free oriented polymer layer partly bonded to the first oriented polymer layer via a second adhesive pattern, the first and second oriented polymer layers forming, once bonded in register, an inflatable outlet tube, said inflatable tube being partially disconnected from the rest of said laminate by a surrounding outer score line allowing the tube to lift off from the first laminate under increased pressure in the pack;
  wherein the at least one inlet perforation and the inflatable outlet tube preferentially permit gaseous communication in one direction, the gas entering through the at least one perforation, travelling through the liquid film and exiting through the inflatable tube.

Preferred embodiments of the present invention disclose one or more of the following features:
- the surrounding outer score line is interrupted at least once at a location corresponding to the outlet opening(s) of the inflatable outlet tube and an additional interrupted score line is provided adjacently parallel to the interrupted part of the surrounding outer score line, the interruptions of both score lines being alternately positioned;
- the opening pressure of the pressure-release valve is lower than 5000 Pa, preferably lower than 3000 Pa, yet preferably lower than 2000 Pa, and most preferably lower than 1500 Pa, or even less than 1000 Pa, to achieve easy opening and high output of the valve;
- the second oriented polymer layer is a patch, preferably a patch of a thickness of 60 µm or less, preferably of 50 µm or less, more preferably of 40 µm or less, and most preferably of 30 µm or less, to avoid substantial local over-thicknesses on the reels of said flexible multilayer;
- the patch comprises a barrier such as a metallized layer, an aluminum layer, a silicon oxide or aluminum oxide layer or an ethylene vinyl alcohol copolymer (EVOH) coating;
- the first and second oriented polymer layers are independently selected from the group consisting of oriented polyester, oriented polypropylene and oriented polyamide;
- the first and/or second oriented polymer layer(s) comprise(s) a barrier such as a metallized layer, an aluminum layer, a silicon oxide or aluminum oxide layer or an ethylene vinyl alcohol copolymer (EVOH) coating;
- the liquid film comprises a liquid selected from the group consisting of silicon oil, hydrocarbon oil, vegetable oil and water;
- the liquid has a dynamic viscosity at room temperature comprised between 1 cP and 15000 cP, preferably between 500 cP and 1300 cP;
- the spacer means comprise particles with an average particle size comprised between 10 and 60 µm, and preferably between 20 and 50 µm, and selected from the group consisting of powdered polymers, silica, carbon, carbon black and mixtures thereof;
- the off-gassing flow capacity of the valve is higher than 5 $cm^3$/min, preferably higher than 10 $cm^3$/min, more preferably higher than 15 $cm^3$/min, and most preferably higher than 20 $cm^3$/min.

The present invention further discloses a method for making the flexible multilayer laminate with an integrated pressure-release valve, said method comprising the steps of:
a) providing a first part of the laminate comprising a seal layer;
b) applying a first adhesive pattern on said first part of the laminate, said adhesive pattern comprising one or more adhesive-free regions of various shapes;
c) joining a first oriented polymer layer to the first part of the laminate to form the second part of the laminate;
d) perforating said second part of the laminate in the area surrounded by the adhesive-free region(s);
e) applying a second adhesive pattern on the second part of the laminate;

f) applying a liquid on the second part of the laminate at the location surrounding the perforations;

g) joining a second oriented polymer layer to the first oriented polymer layer by means of a second adhesive pattern;

h) partly separating the first oriented polymer layer from the surrounding multilayer laminate by scoring means to form an inflatable outlet tube when the second oriented polymer layer is a patch.

Preferred embodiments of the method for making said flexible multilayer laminate disclose one or more of the following features:

- step h) comprises the partial separation of the second oriented polymer layer from the surrounding multilayer laminate by scoring means to form the inflatable outlet tube, when the second oriented polymer layer is part of the initial multilayer laminate;
- step f) comprises the addition of from 1 to 10% by weight, preferably from 3 to 7% by weight, of spacer means concentrated at the location of the at least one perforation, the liquid and the spacing means taken at 100% by weight.

Figure 1:
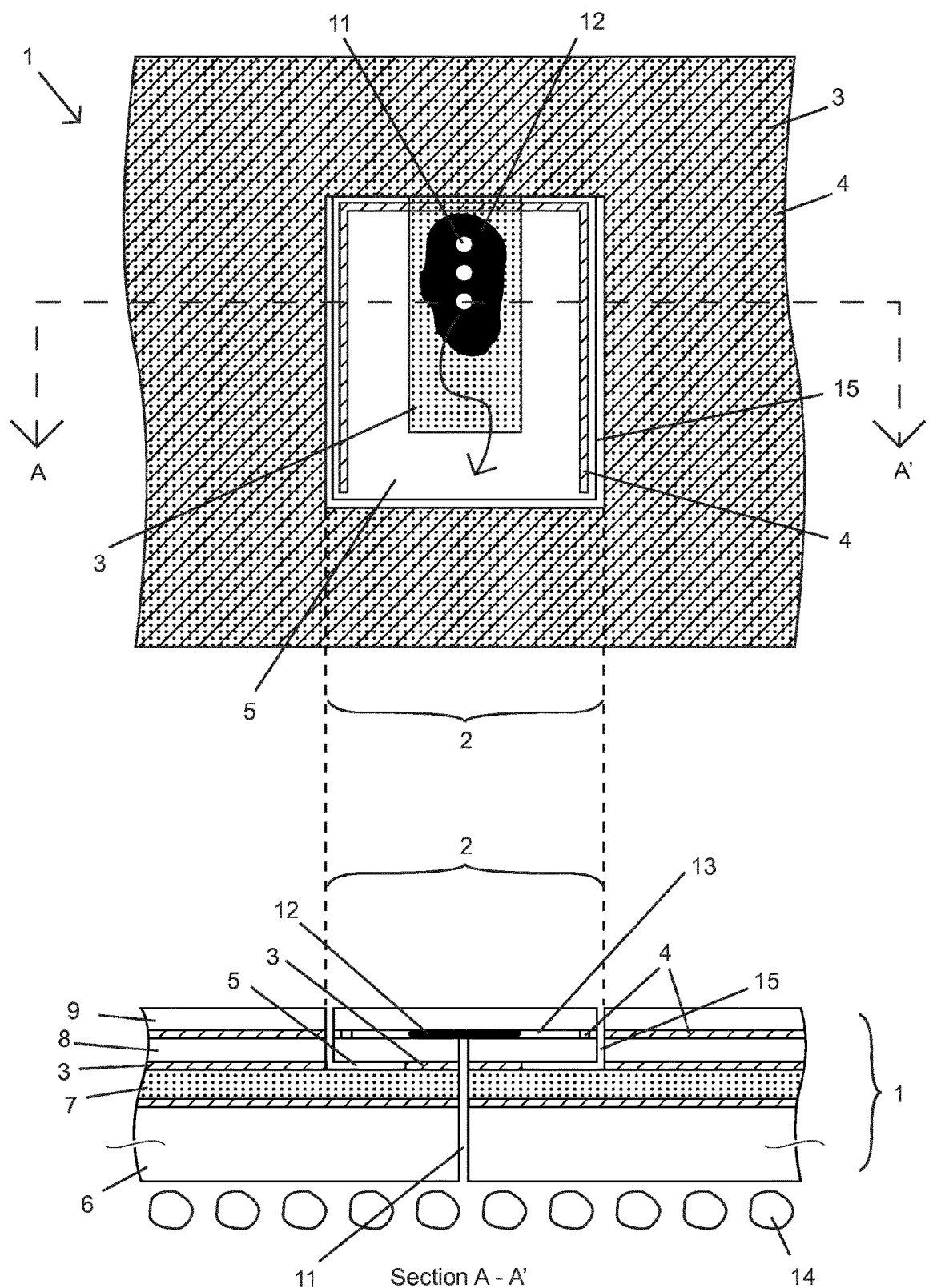
FIG. 1 represents a top view and a cross-section view of the flexible multilayer laminate according to the invention.

KEY 1. flexible laminate
2. one-way pressure-release valve
3. first adhesive pattern
4. second adhesive pattern
5. first adhesive-free region
6. seal layer
7. barrier layer
8. first oriented polymer layer
9. second oriented polymer layer
10. patch
11. perforation
12. liquid, optionally comprising spacer means (not shown)
13. inflatable outlet tube
14. gas
15. score line
16. additional interrupted score line
17. outlet opening of the inflatable outlet tube

DETAILED DESCRIPTION OF THE INVENTION

The present invention is related to a flexible laminate having an integrated, one-way pressure-release valve. The laminate may be used in conjunction with a sealed container used to pack products such as those containing gasses or generating off-gasses, or those transported through changes in altitude and temperature. Although the laminate may be used in conjunction with a variety of different containers and placed in a variety of different ways to achieve the desired effect, it is preferably used in conjunction with containers made from plastics, composites and the like. Indeed, the present laminate may even be bonded to itself to form a pouch or bag. Regardless of how the laminate of the present invention is used, the structure of the integrated valve provides pressure release in a preferred direction.

The one-way pressure-release valve of the present invention is integrated within a laminate, the valve functioning in one instance to release pressure built up within the container due to such factors as off-gassing of a product therein, increase in altitude and increase in temperature. Moreover, the pressure-release valve of the present invention functions in another instance to prevent air from entering the container when the internal pressure of the container is less than the external pressure, which may result from the adsorption, absorption, or reaction of gasses generated by the product within the container, a decreased temperature or a decreased altitude. Thus, even though the internal pressure of the container may increase or decrease in relation to the external atmosphere, the present valve adapts accordingly, thereby preserving the integrity of the seal, the container and the product therein.

Figure 12:
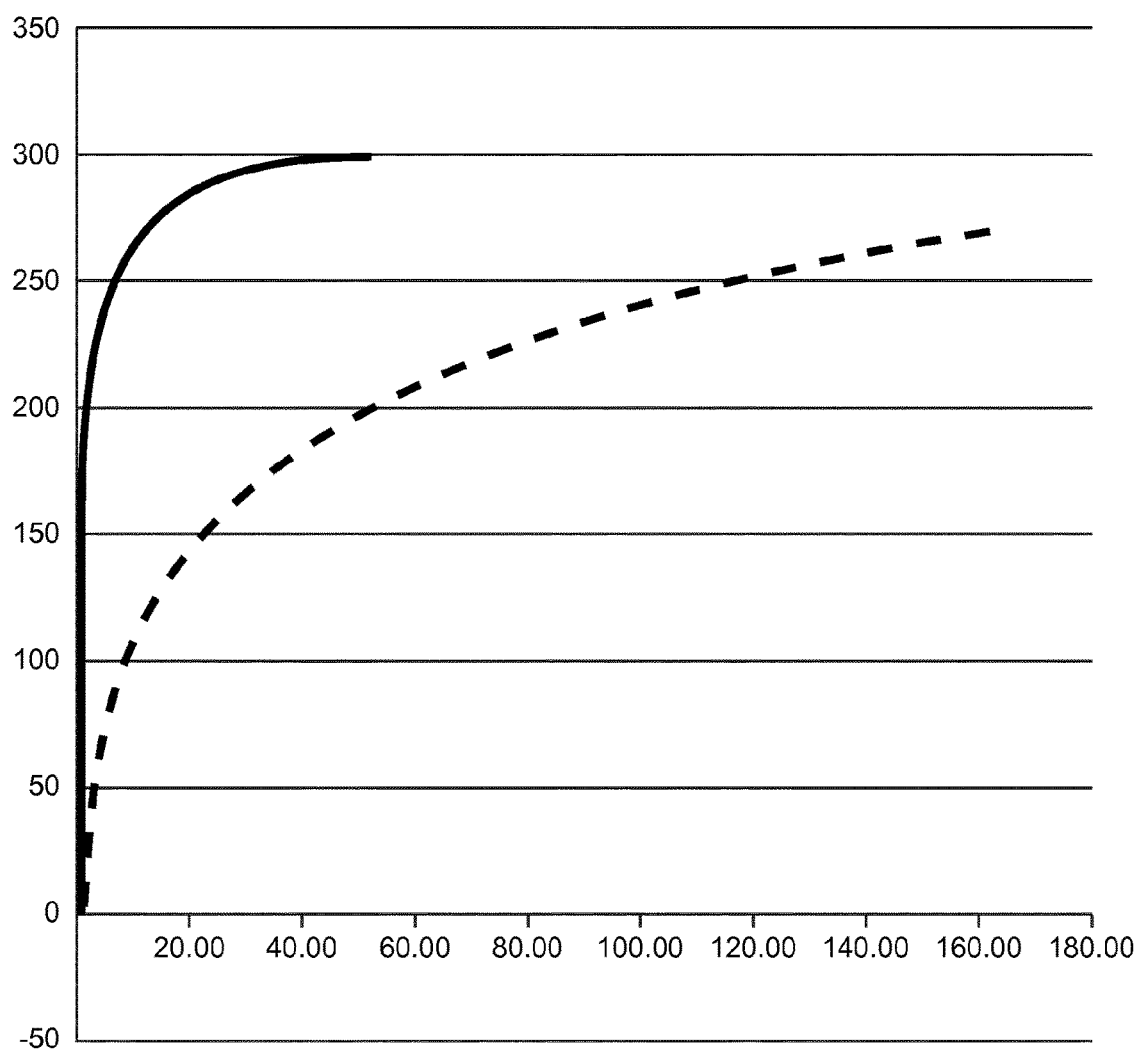
FIG. 12 represents a graph showing coffee off-gassing as a function of time, wherein the abscissa represents the off-gassing period in hours and the ordinate represents the number of millilitres of off-gassed carbon dioxide. The continuous line stands for ground coffee off-gassing while the dashed line stands for the off-gassing of coffee beans.

The one-way pressure-release valve of the present invention allows for the packaging of products characterized by an important off-gassing flow rate; the one-way pressure-release valve of the present invention thus allows for packing ground coffee immediately after grinding, without intermediate storage, at a moment where the degassing of carbon dioxide is important (see FIG. 12).

The one-way pressure-release valve of the present invention is characterized by a reliable and reproducible functioning at low opening pressure throughout the entire life cycle of the packaging.

Figure 2:
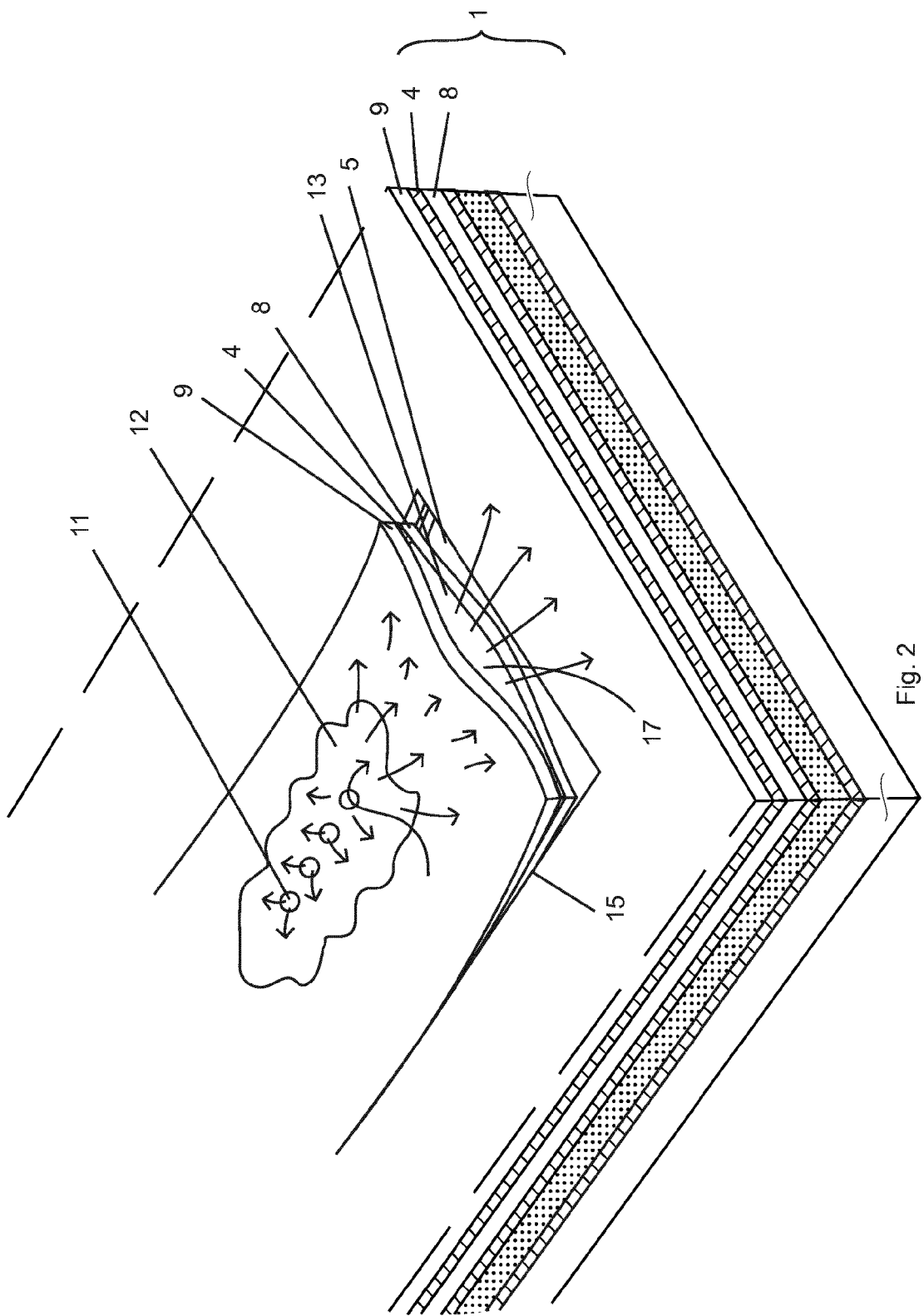
FIG. 2 represents a top view of the valve region releasing gas via one outlet opening, through the inflatable outlet tubing once a minimum opening pressure is reached.
Figure 3:
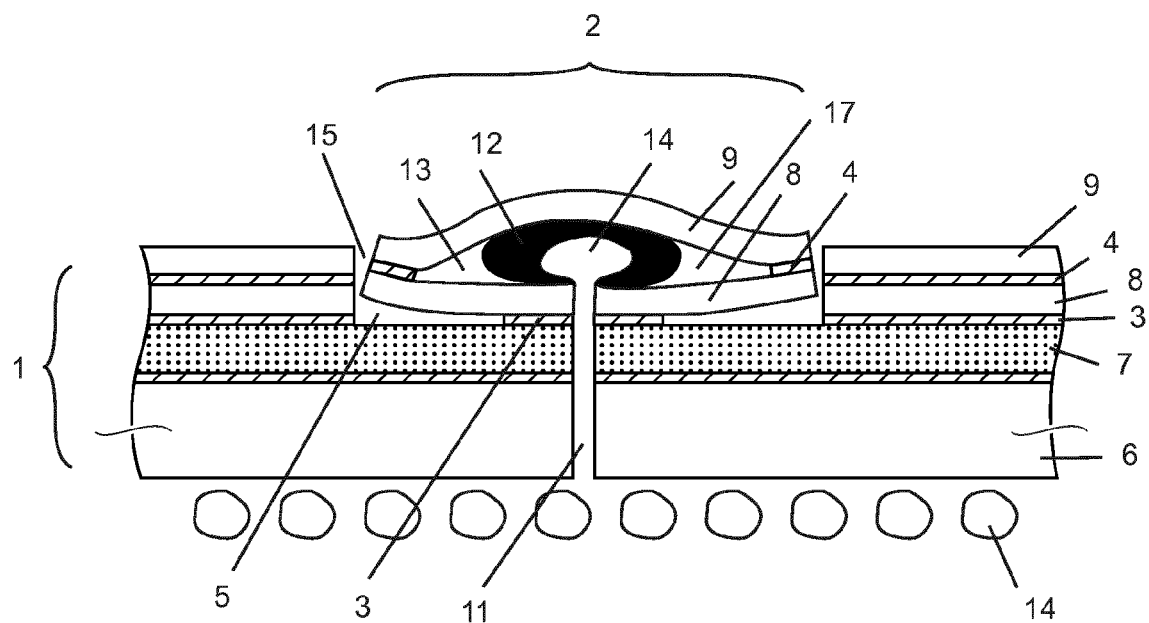
FIG. 3 represents a cross-section view of the valve region releasing gas through the inflatable outlet tubing, once a minimum opening pressure is reached.
Figure 4:
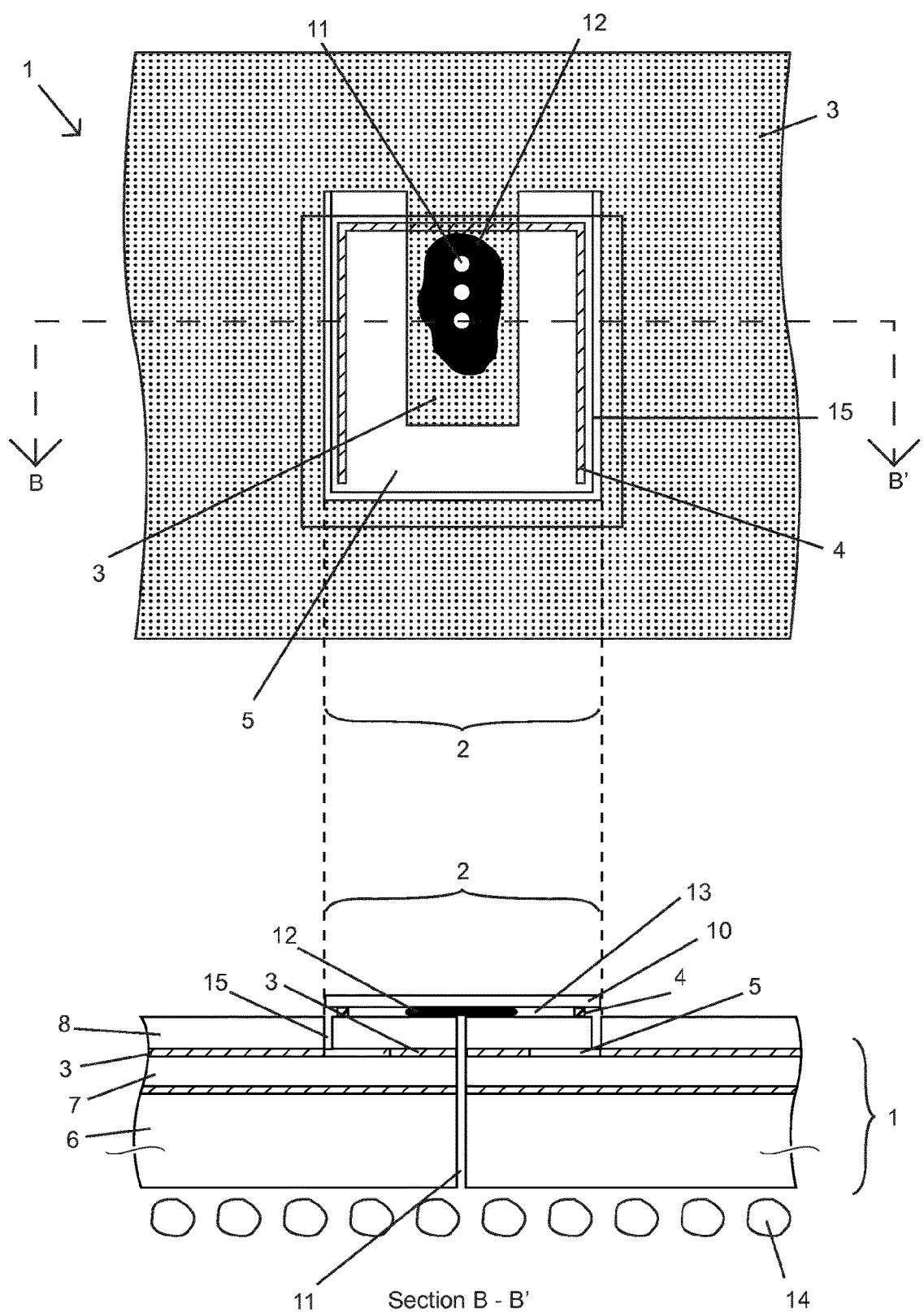
FIG. 4 represents a top view and a cross-section view of the flexible multilayer laminate according to the invention, comprising a patch partly bonded in register.

Referring to the embodiment illustrated in FIGS. 1 to 3, the flexible laminate 1 of the present invention with the valve 2 comprises an underlying layer with a seal layer 6 and a barrier layer, and a first oriented polymer layer 8 which is laminated to said underlying layer substantially over the entire extension of the laminate by means of a first adhesive pattern 3 comprising a first adhesive-free region 5.

The first adhesive-free region 5 can be of any shape, but preferably is "O"-shaped (circular), "☐"-shaped (square-frame), "▯"-shaped (rectangular-frame), "‖"-shaped (parallel strips) or "⊔"-shaped (U-type).

At least one perforation 11 is provided through the first oriented polymer layer 8, the first adhesive pattern 3 and the underlying layer, comprising the seal layer 6 and the barrier layer 7, at such a location that the at least one perforation 11 is completely surrounded by the adhesive and has the adhesive-free region 5 located at least on both of its sides.

The at least one perforation 11 may be in the form of slits, holes and the like. In order to prevent the product to be packed from entering the inflatable outlet tube 13, the at least one perforation has a diameter smaller than most of the products to be packed. When the product to be packed is granular or powder material, the diameter of the perforation is smaller than most of the particles of said product. When the product to be packed is ground coffee, the diameter of the at least one perforation is smaller than 200 µm, preferably smaller than 150 µm. However the diameter of the at least one perforation is between 50 µm and 500 µm.

The valve region 2 may be provided with at least two slightly interspaced perforations, e.g. being interspaced by 0.5 to 2.0 mm, especially 0.5 to 1.0 mm. Further, the valve region 2 may be provided with more than two perforations, such as five slightly interspaced perforations. Optionally, the valve region 2 may be provided with nine or more slightly interspaced perforations which may be arranged in different patterns.

By using an increased number of perforations, the opening pressure and/or the opening time of the valve can be reduced.

A second oriented polymer layer 9 is then laminated to the first oriented polymer layer 8 via the second adhesive pattern 4, forming an inflatable outlet tube 13 in the area corresponding to the adhesive-free region 5, the adhesive-free region 5 allowing said inflatable outlet tube 13 to be partially disconnected from the rest of the flexible laminate 1.

The adhesive-free zone(s) of the second adhesive pattern 4 allow the formation of the inflatable outlet tube 13 and the positioning of liquid film 12 in between the first 8 and the second 9 oriented polymer layers.

Positioning the at least one perforation 11 and outlet opening 17 in such a way as to be offset from one another allows the present valve 2 to preferentially function in one direction, i.e. from the inside of a container to the outside of a container.

Gas 14 generated inside a sealed packaging can traverse the at least one perforation 11 into the liquid film 12 and then continue through the at least one outlet opening 17 of the inflatable tube 13; the reverse movement of gas from the outside to the inside of a sealed packaging being impossible.

Liquid film 12 can be any fluid and may comprise, for example, silicon oil, hydrocarbon oil, vegetable oil, water or the like, variants of which would be known to those skilled in the art. The liquid film is characterized by a dynamic viscosity at room temperature comprised between 1 cP and 15000 cP, preferably between 500 and 13000 cP.

The amount of liquid film deposited between the first 8 and second 9 oriented polymer layers is in the range comprised between 0.1 µl and 10 µl. It should be noted that liquid film 12 may be applied in excess because pressure applied during the lamination process removes most of the excess, although enough liquid film remains to maintain the functionality of the present valve.

The liquid film 12 thus provides communication of gas 14 through the at least one perforation 11 and the at least one outlet opening 17 of the inflatable outlet tube 13 in one direction only, i.e. from the inside to the outside of the packaging.

While liquid film 12 may be used independently to control gaseous communication, the addition of particles to the liquid film 12 is optional but preferred. Such particles may comprise powdered polymers, silica, carbon, carbon black and mixtures thereof, although other similar particles useful herein would be known to those skilled in the art. Preferably, the particles comprise a powdered polymer selected from the group consisting of powdered polyamide, polyester, silicone and combinations thereof. More preferably, the particles comprise powdered polyamide.

The spacer means are characterized by an average particle size comprised between 10 and 60 µm, preferably between 20 and 50 µm.

The addition of particles to liquid film 12 at the location of the at least one perforation works in conjunction with the offset placement of the at least one perforation 11 and the at least one outlet opening 17 within the valve region 2, to provide preferential release of gas 14 in a preferred direction, i.e. out of a container.

Without intending to be bound by theory, particles provide preferential release of gas 14 in a preferred direction through the valve by reducing the adhesiveness of oriented polymer layer 9 to oriented polymer layer 8 via liquid film 12 at the location of the at least one perforation 11 such that pressurized gas 14 traversing through the at least one perforation 11 may be in gaseous communication with the at least one outlet opening 17; the presence of particles enhancing off-gassing through the valve.

This open orientation of the inflatable outlet tube 13 is illustrated in FIGS. 2 and 3 and generally occurs at an internal pressure of less than 5000 Pa, preferably less than 3000 Pa, more preferably less than 2000 Pa, and most preferably less than 1500 Pa, or even less than 1000 Pa. The pressure needed to open the valve region 2 is based on several factors, including, but not limited to, number and size of perforations 11, number and size of outlet openings 17 in relation to the size of the container, viscosity of the liquid, off-gassing of the packed product, and the like.

The distension of un-bonded region at the location of the at least one perforation 11 permits gas 14 to more easily traverse through the liquid film 12 through the outlet opening 17. Once gas 14 has traversed the inflatable outlet tube 13, the adhesiveness of liquid film 12 self-compresses the second oriented polymer layer 9 to first oriented polymer layer 8, thereby halting gaseous communication within the inflatable outlet tube 13 until gas 14 builds again and begins traversing through the at least one perforation 11.

Self-compression by the adhesiveness of liquid film 12 generally occurs at a pressure of less than about 500 Pa, preferably less than about 200 Pa. Moreover, if any gas attempts to enter through outlet opening 17, it is prevented from doing so because liquid film 12 disposed proximate to outlet opening 17 acts as an adhesive that effectively seals the valve region 2 and prevents the distention of the first oriented polymer layer 8 and/or the second oriented polymer layer 9 that is necessary for gaseous communication within the valve region 2 to occur.

Thus, having at least one perforation 11, which is in direct contact with liquid film 12 optionally having particles admixed with liquid film 12, and at least one outlet opening 17, which is in direct contact with liquid film only, placed so as to be offset from one another within valve region 2, effectively allows the present pressure-release valve to function in a preferred direction.

The one-way outlet valve 2 is represented in FIG. 1 in a closed position.

The one-way outlet valve 2 of the present invention, in open position, is illustrated in FIGS. 2 and 3. The partial disconnection of said valve 2 from the flexible laminate 1 implies that the functioning of said valve 2 is independent of the history or the current state of the rest of the flexible laminate 1. In contrast to the one-way pressure-release valves as disclosed in the prior art, stresses in the laminate 1 due for example to pressure differentials and/or mechanical deformation will not affect the proper functioning of the valve 2 during the life of the derived packaging. Upon functioning, valve 2 lifts up from laminate 1, which results in an increased output capacity of said valve.

Returning to FIG. 1, the one-way pressure-release valve has a rectangular shape and is obtained from laminating the first oriented polymer layer 8 to the underlying seal layer 6 and barrier layer 7, substantially over the entire extension of the laminate by means of a first adhesive pattern 3, comprising a "⌴"-shaped (U-type) first adhesive-free region 5.

A plurality of perforations 11 is provided through the first oriented polymer layer 8, the first adhesive pattern 3, the underlying barrier layer 7 and seal layer 6 at the location where the plurality of perforations 11 is completely surrounded by adhesive and has the adhesive-free region 5 located along three of its sides.

In a first embodiment of the invention, a second oriented polymer layer 9 is then laminated to the first oriented polymer layer 8 over the entire extension of the laminate via a second adhesive pattern 4 forming the inflatable tube 13 in the area corresponding to the adhesive region 5. The inflatable outlet tube 13 comprises one outlet opening 17.

The adhesive-free region 5 allows said inflatable outlet tube to be partially disconnected from the rest of the laminate 1, allowing said outlet tube to lift off from the laminate 1 under increased pressure in the packing.

While flexible laminate 1 may comprise any number of layers, the overall thickness of the laminate should be from about 10 μm to about 200 μm, preferably from about 20 μm to about 170 μm, more preferably from about 30 μm to about 150 μm.

Referring to a second embodiment, illustrated in FIGS. 4 to 7, a flexible laminate 1, comprising the one-way release valve 2 of the present invention, has a rectangular shape and is obtained from laminating the first oriented polymer layer 8 to the underlying seal layer 6 and a barrier layer 7, substantially over the entire extension of the laminate by means of a first adhesive pattern 3 comprising a "⌴"-shaped (U-type) first adhesive-free region 5.

A plurality of perforations 11 is provided through the first oriented polymer layer 8, the underlying barrier layer 7 and the seal layer 6, at the location where the plurality of perforations 11 is completely surrounded by adhesive and has the adhesive-free region 5 located along three of its sides.

A rectangular patch 10 having dimensions substantially corresponding to the dimensions of the adhesive-free region 5 is laminated in register to the first oriented polymer layer 8 at the location of the adhesive-free region 5 via a second "Π"-shaped (inverse U-type) adhesive pattern 4 thus forming the inflatable outlet tube 13 comprising one outlet opening 17.

The first oriented polymer layer 8 corresponding to the adhesive-free region 5 is partially disconnected from the rest of the flexible laminate 1 by a score line 15 forming together with patch 10 bonded in register, via the second adhesive pattern 4, an inflatable outlet tube 13 comprising one outlet opening 17.

Figure 5:
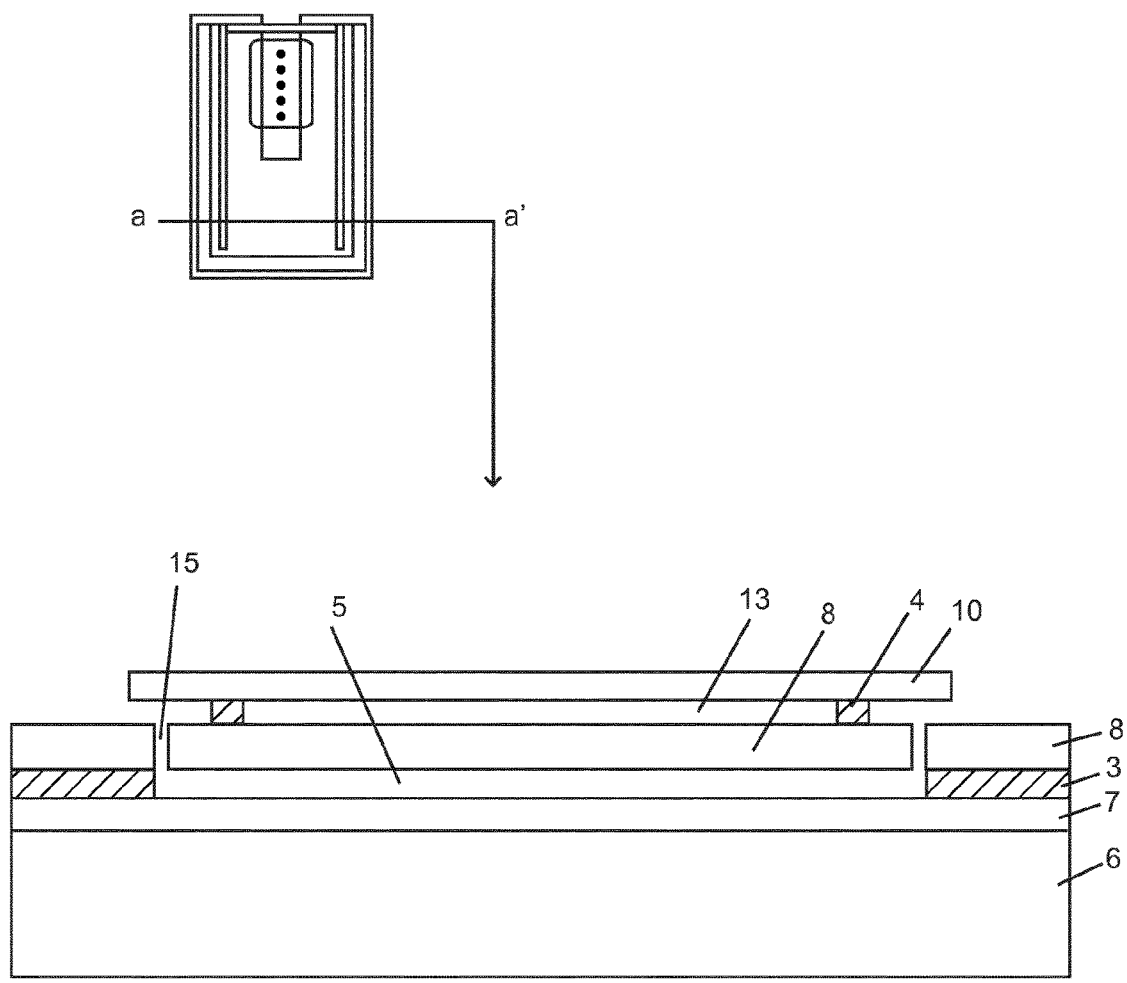
FIG. 5 represents a cross-section of the flexible multilayer laminate of FIG. 4 at the location of the first adhesive-free region.
Figure 6:
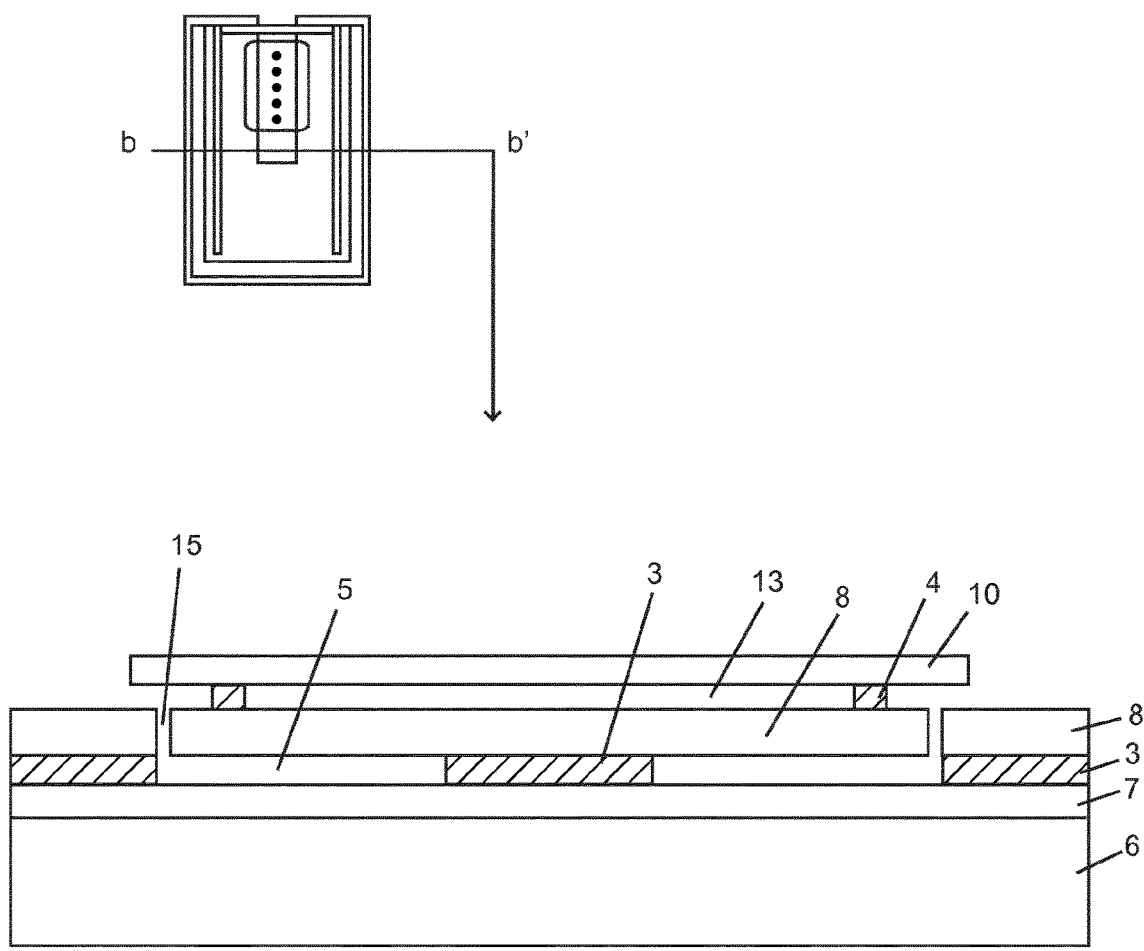
FIG. 6 represents a cross-section of the flexible multilayer laminate of FIG. 4 at the location of the first adhesive pattern.
Figure 7:
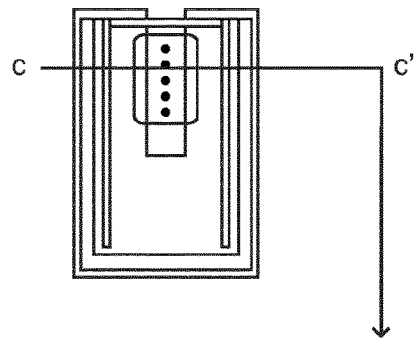
FIG. 7 represents a cross-section of the flexible multilayer laminate of FIG. 4 at the location of a perforation.
Figure 7:
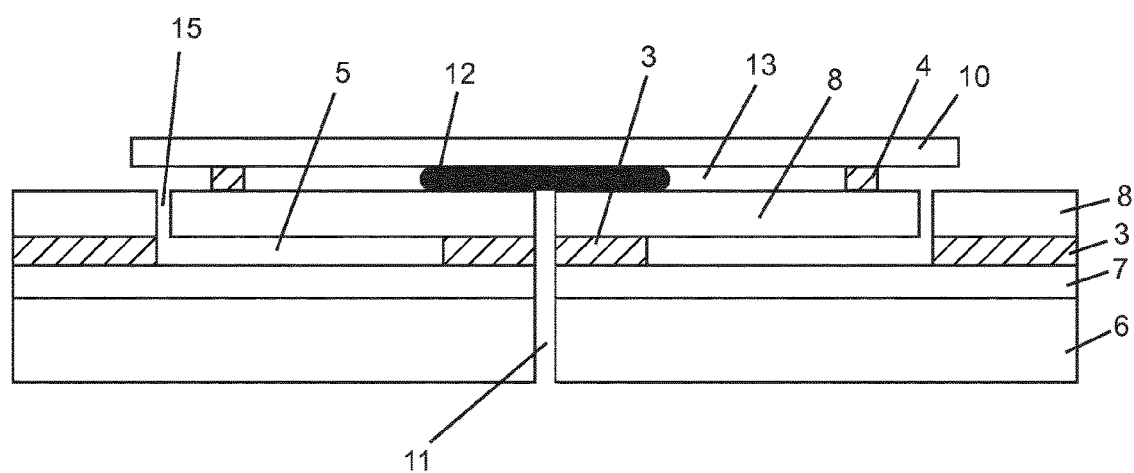

FIGS. 5 to 7 are representations of cross-sections at different locations of the one-way outlet valve of the present invention (section a-a', section b-b' and section c-c').

The liquid film 12 is preferably deposited between the first oriented polymer layer 8 and patch 10 while spacer means are preferably concentrated around the plurality of perforations 11.

Figure 8:
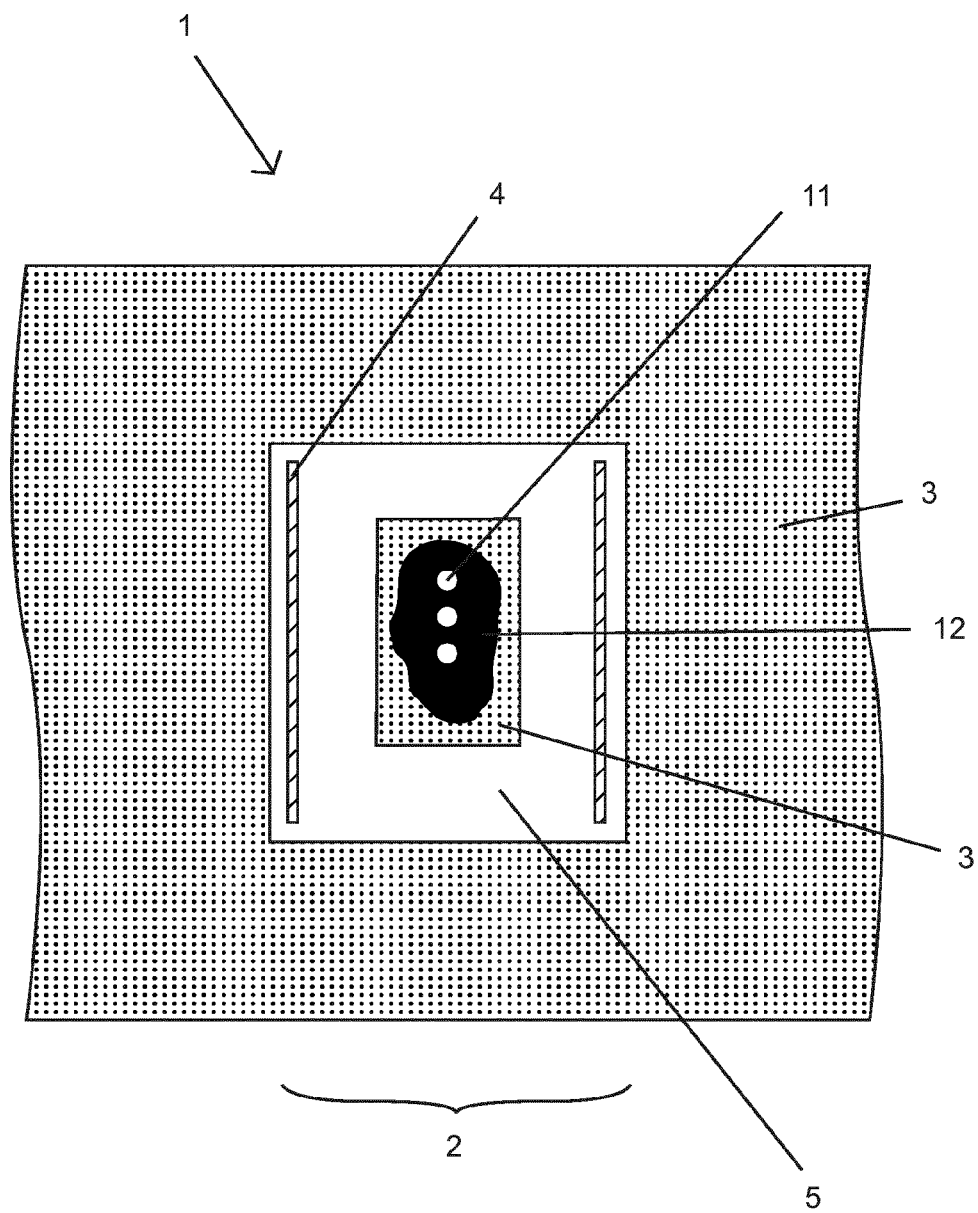
FIG. 8 represents a top view of the flexible multilayer laminate comprising the valve region, wherein the first adhesive-free region is "☐"-shaped.

Referring to another exemplary embodiment of the present invention, as illustrated in FIG. 8, the first adhesive-free region 5 is rectangular-frame shaped. For the case of a rectangular patch 10, the second adhesive pattern 4 comprises two parallel zones applied on the first oriented polymer layer 8 on two edges within the first adhesive-free region 5. The patch is bonded in register to oriented polymer layer 8 via the second adhesive pattern 4.

Figure 11:
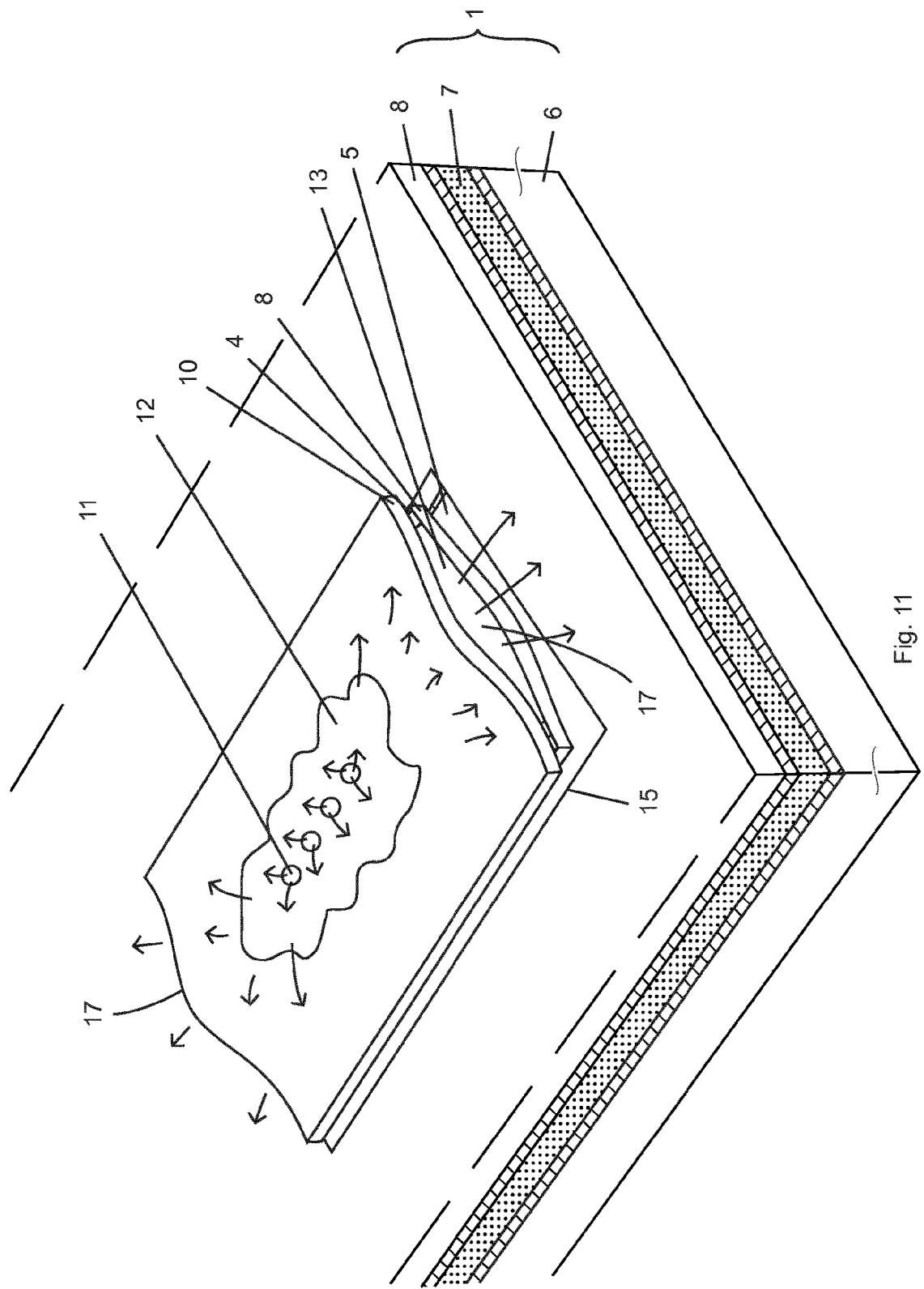
FIG. 11 represents a top view of the valve region releasing gas via two outlet openings through the inflatable outlet tubing, once a minimum opening pressure is reached.

Disconnecting oriented polymer layer 8 from the rest of the flexible laminate 1 by a score line 15 situated at the edges of the adhesive-free region 5 results in the formation of an inflatable outlet tube 13 having two outlet openings 17, as illustrated in FIG. 11.

Figure 9:
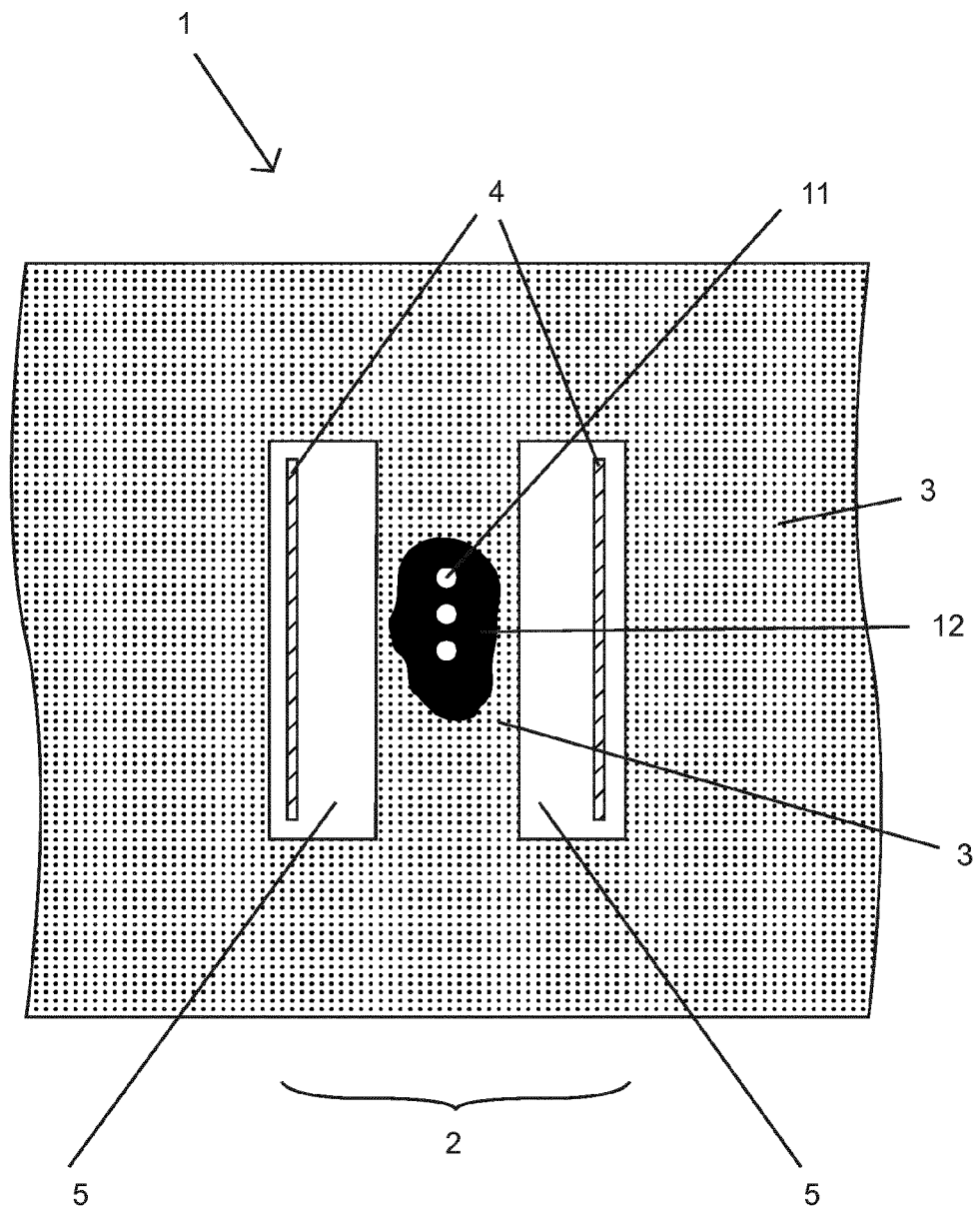
FIG. 9 represents a top view of the flexible multilayer laminate comprising the valve region, wherein the first adhesive-free region is "||"-shaped.

Referring to still another exemplary embodiment of the present invention, as illustrated in FIG. 9, the first adhesive-free region 5 is "‖"-shaped (parallel strips). For the case of a rectangular patch 10, the second adhesive pattern 4 comprises two parallel zones applied on the first oriented polymer layer 8 on the outer edges within each strip of the first adhesive-free region 5. Partially disconnecting oriented polymer layer 8 from the rest of the flexible laminate 1 by a score line 15 situated at the edges of the adhesive-free region 5 results in an inflatable outlet tube 13 having two outlet openings 17, as illustrated in FIG. 11.

The one-way pressure-release valve 2 of the present invention is preferably square or rectangular-shaped with side lengths independently comprised between 10 and 70 mm, and preferably between 15 and 50 mm.

The first adhesive-free region 5 according to the present invention is preferably "⌴"-shaped (U-type), "‖"-shaped (parallel strips), or square- or rectangular frame shaped with side lengths independently comprised between 10 and 70 mm, and preferably between 15 and 50 mm.

The patch 10 is selected from the group consisting of oriented polyester, oriented polypropylene, coextruded oriented polypropylene, oriented polyamide, polypropylene and polyethylene, and is characterized by a thickness comprised between 5 and 60 μm, preferably lower than 50 μm, more preferably lower than 40 μm, and most preferably lower than 30 μm, to avoid substantial local over-thicknesses on the reels of said flexible multilayer 1; the patch is further preferably characterized by a square or rectangular shape with a side length independently comprised between 10 and 80 mm, preferably between 15 and 60 mm, most preferably between 20 and 50 mm.

The patch 10 can comprise a barrier layer such as a metallized layer, an aluminum layer, a silicon oxide or aluminum oxide layer or an ethylene vinyl alcohol copolymer (EVOH) coating.

The first 8 and second 9 oriented polymer layers are independently selected from the group consisting of oriented polyester, oriented polypropylene and oriented polyamide.

In a particular embodiment, the oriented polymer layer 8 comprises a barrier layer such as a metallized layer, an aluminum layer, a silicon oxide or aluminum oxide layer or an ethylene vinyl alcohol copolymer (EVOH) coating.

The flexible laminate 1 may comprise any number of layers and is characterized by an overall thickness of the laminate that should be from about 10 μm to about 200 μm, preferably from about 20 μm to about 170 μm, more preferably from about 30 μm to about 150 μm.

The barrier layer 7 comprises polymers selected from the group consisting of ethylene vinyl alcohol, polyvinyl alcohol, polyvinylidene chloride, polyester and combinations thereof. The barrier layer 7 can further be a metallic or a metallization layer.

A metallization layer may be deposited for decreasing oxygen permeability and improving the aesthetic appearance of the flexible laminate 1. The metallization layer preferably comprises aluminum and can be deposited by a vacuum-deposition process.

The seal layer 6 comprises polymers selected from the group consisting of polyethylene, polypropylene, copolymers thereof, and mixtures thereof.

The adhesives comprised in the first adhesive pattern 3 and the second adhesive pattern 4 may be any suitable adhesive; preferred for use herein includes, but is not limited to, pressure-sensitive adhesives such as these based on acrylic copolymers and permanent adhesives such as these based on polyurethanes.

The first 8 and/or second 9 oriented polymer layers are optionally transparent, having print applied either to that side of the second oriented polymer layer 9 that is laminated to the first oriented polymer layer 8, or to that side of the first oriented polymer layer 8 that is laminated to the underlying layer comprising the barrier layer 7 and the seal layer 6. Reverse printing is preferably used to avoid damage of the print.

Figure 10:
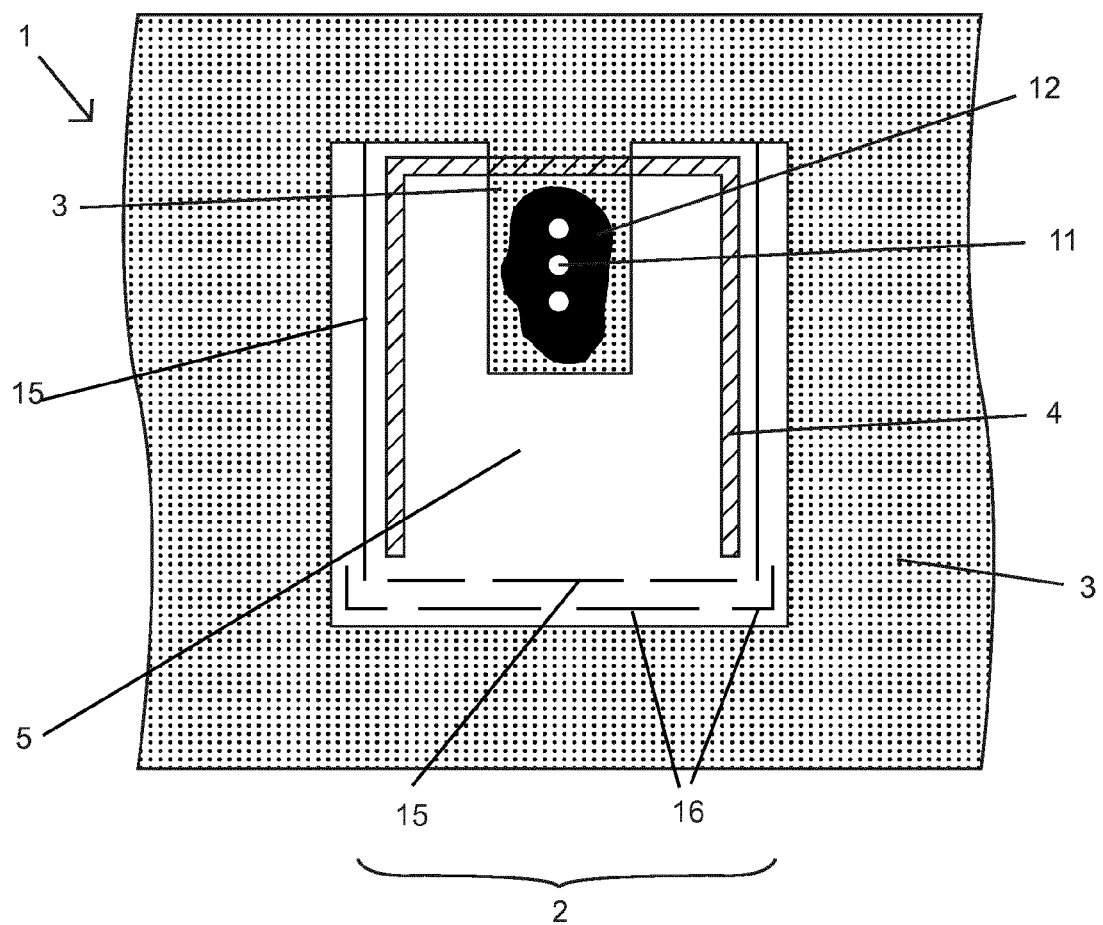
FIG. 10 represents a top view of the flexible multilayer laminate comprising the valve region, wherein the first adhesive-free region is "⌴"-shaped and wherein two parallel, adjacent interrupted score lines are provided.

Referring to a particular embodiment of the present invention, as represented in FIG. 10, part of the score line 15 is interrupted, at least once, at the location corresponding to the outlet opening(s) 17 of the inflatable outlet tube 13. Adjacently parallel to the interrupted part of said score line 15, an additional interrupted score line 16 is applied in such a way that the interruptions of both score lines are alternately positioned.

This particular embodiment comprising interrupting part of score line 15 is applicable for the various types of adhesive-free regions 5, as previously mentioned, and is applicable to both the first embodiment, in which a second film is laminated, and the second embodiment, in which a patch is used.

Interrupted score lines allow for keeping the outlet opening part 17 of the one-way pressure-release valve 2 down to the flexible laminate 1, which is important during the manufacturing process, particularly those where high line speeds are applied, while guaranteeing excellent one-way gas release properties of said valve 2 which nonetheless is not exposed to possible stresses in the rest of the flexible multilayer laminate 1.

The flexible multilayer laminate 1 having an integrated pressure-release valve 2 is prepared according to a method comprising the steps of:
a) providing a first part of the laminate comprising a seal layer 6;
b) applying a first adhesive pattern 3 on said first part of the laminate, said adhesive pattern comprising one or more adhesive-free regions 5 of various shapes;
c) joining a first oriented polymer layer 8 to the first part of the laminate to form the second part of the laminate;
d) perforating said second part of the laminate in the area surrounded by the adhesive-free region(s) 5;
e) applying a second adhesive pattern 4 on the second part of the laminate;
f) applying a liquid 12 on the second part of the laminate at the location surrounding the perforations;
g) joining a second oriented polymer layer 9 to the first oriented polymer layer 8 by means of a second adhesive pattern 4;
h) partly separating the first oriented polymer layer from the surrounding multilayer laminate by scoring means to form an inflatable outlet tube 13 when the second oriented polymer layer is a patch.

In the embodiment where the second oriented polymer layer 9 is laminated to the first oriented polymer layer 8 over the entire extension of the laminate, partial disconnection is performed by cutting both the first oriented polymer layer 8 and the second oriented polymer layer 9 at the rim of the first adhesive-free region 5.

Preferably, spacer means are introduced in step f). The spacer means are preferably powdered polymers with an average particle size comprised between 10 and 60 μm, preferably between 20 and 50 μm. The spacer means are generally applied together with the liquid in a quantity comprised between 1 and 10% by weight, preferably between 3 and 7% by weight.

EXAMPLES

The following illustrative examples are merely meant to exemplify the present invention but is not destined to limit or otherwise define the scope of the present invention.

Example 1

A laminate was produced by laminating a reverse-printed, coextruded oriented polypropylene film with a thickness of 20 μm (oriented polymer layer 8) to an underlying layer comprising a metallized, oriented polyethylene terephthalate film with a thickness of 12 μm (barrier layer 7) and a polyethylene film having a thickness of about 85 μm (seal layer 6) via a first adhesive pattern 3 comprising an first "⊔"-shaped (U-type) adhesive-free region 5. The "⊔"-shaped adhesive-free region 5 can be visualized as being a rectangle with sides of 15 to 50 mm, comprising a central 5 to 20 mm rectangular adhesive-comprising protruding region, wherein the 5 mm side of the adhesive-comprising protruding region is tangent to, and centered on the 15 mm side of the of the 15 to 50 mm adhesive-free rectangle.

A plurality of perforations 11 was provided through said laminate at the location of said 5 to 20 mm adhesive-comprising protruding region. The plurality of perforations 11 was provided around the center of the adhesive-comprising protruding region, at such a location that it was completely surrounded by adhesive.

A second "⊓"-shaped (inverse U-type) adhesive pattern 4 was provided along the edge of three sides (50-15-50 mm, wherein the adhesive-comprising protruding region is tangent to said 15 mm side) of the rectangular first adhesive-free region 5 (see FIGS. 4 to 7). The "⊓"-shaped pattern was about 2 mm wide, with the legs of the "⊓" being 17 mm and wherein the base was 12 mm. The base of the "⊓" was centrally disposed with respect to the 15 mm side, comprising the central adhesive-comprising protruding region, of the "⊔"-shaped adhesive-free region 5.

A silicone oil with a dynamic viscosity of 1000 cP comprising 5% by weight of polyamide powder with an average particle size of 40 μm was provided at the location of the plurality of perforations 11 and covered an area of about 5 to 5 mm.

A patch of 20 to 20 mm was partly bonded in register to the coextruded oriented polypropylene film (first oriented polymer layer 9) via the second adhesive pattern 4 forming the valve region 2. The patch 11 consisted of a coextruded, oriented polypropylene film with a thickness of 40 μm coated with an ethylene vinyl alcohol copolymer at an amount of 1 g/m$^2$.

Example 2

A laminate was produced by laminating a reverse-printed, oriented polyester film with a thickness of 12 μm (oriented polymer layer 9) to an underlying layer comprising a 9 μm aluminum layer (barrier layer 7) and a polyethylene film having a thickness of about 70 μm (seal layer 6) via a first adhesive pattern 3 as in Example 1. The laminate was further processed as in Example 1.

The one-way valves produced in Example 1 and Example 2 had a minimum opening pressure of about 5500 Pa.

Partly disconnecting the valve region 2, corresponding to the "⊔"-shaped adhesive-free region 5, from the rest of the laminate by laser cutting the oriented polymer layer 9 along the edge of three sides (50-33-50 mm, wherein the 33 mm side is the one to which the adhesive-comprising protruding region is not tangent) of the first "⊔"-shaped adhesive-free region 5 at the outside of part of the second "⊓"-shaped (inverse U-type) adhesive pattern 4 (see FIGS. 4 to 7), reduced the minimum opening pressure to about 900 Pa.

For the determination of the minimum opening pressure, the pressure difference was measured over the valve for a gas flow of 16 cm$^3$/min.

Example 3

A laminate was produced by laminating a reverse-printed, oriented polyester film with a thickness of 12 μm (oriented polymer layer 8) to an underlying layer comprising a 9 μm aluminum layer (barrier layer 7) and a polyethylene film having a thickness of about 70 μm (seal layer 6) via a first adhesive pattern 3 comprising an first "∥"-shaped (parallel strips) adhesive-free region 5 consisting of two 10 to 30 mm parallel adhesive-free strips separated by a 8 to 30 mm strip of adhesive (see FIG. 9).

A plurality of perforations 11 was provided through said laminate at the location of said 8 to 30 mm strip of adhesive. The plurality of perforations 11 was preferably provided around the center of said adhesive strip, at such a location that it is completely surrounded by adhesive.

A second adhesive pattern 4 was provided covering the entire extension of the laminate with the exception of the "∥"-shaped (parallel strips) adhesive-free region 5, where the second adhesive pattern 4 was limited to a 2 to 25 mm line at the outer edge of each of the parallel adhesive-free strips of adhesive-free region 5.

A silicone oil with a dynamic viscosity of 1000 cP comprising 5% by weight of polyamide powder with an average particle size of 40 μm was provided at the location of the plurality of perforations 11 and covered an area of about 5 to 5 mm.

An oriented polyester film with a thickness of 12 μm (oriented polymer layer 9) was laminated to the laminate via the second adhesive pattern 4.

Partly disconnecting the valve region 2, corresponding to the"∥"-shaped (parallel strips) adhesive-free region 5, from the rest of the laminate by laser cutting the oriented polymer layer 8 and 9 along the edges of the two parallel 10 to 30 mm adhesive-free strips at the outside of the two adhesive lines of the second adhesive pattern, resulted in an inflatable outlet tube 13 having two outlet openings 17.

Example 4

A laminate was produced by laminating a metallized, oriented polyethylene terephthalate film with a thickness of 12 μm (oriented polymer layer 8/barrier layer 7) to a polyethylene film having a thickness of about 60 μm (seal layer 6) via a first adhesive pattern 3 comprising a "☐"-shaped (square-frame) adhesive-free region 5 with sides of 30 to 30 mm. The "☐"-shaped adhesive-free region 5 had in its centre an 8 mm square-shaped, adhesive-comprising area, the sides of which are parallel to the sides of the adhesive-free region 5 (cf. FIG. 8).

A plurality of perforations 11 was provided through said laminate at the location of said 8 mm square-shaped adhesive-comprising area. The plurality of perforations 11 was provided around the center of the 8 mm square-shaped adhesive-comprising area, at such a location that it was completely surrounded by adhesive.

A second adhesive pattern 4 was provided covering the entire extension of the laminate with the exception of the "☐"-shaped, adhesive-free region 5, where the second adhesive pattern 4 was limited to a 2 to 25 mm line at the outer edge of two opposite sides of the "☐"-shaped, adhesive-free region 5

A silicone oil with a dynamic viscosity of 1000 cP comprising 5% by weight of polyamide powder with an average particle size of 40 μm was provided at the location of the plurality of perforations 11 and covers an area of about 5 to 5 mm. A reverse-printed, coextruded polypropylene film with a thickness of 20 μm (oriented polymer layer 9) was laminated to the laminate via the second adhesive pattern 4.

Disconnecting the valve region 2, corresponding to the "☐"-shaped, adhesive-free region 5, from the rest of the laminate by laser cutting oriented polymer layers 8 and 9 along the edges of the "☐"-shaped, adhesive-free region 5 and at the outside of the two adhesive lines of the second adhesive pattern 4 resulted in an inflatable outlet tube 13 having two outlet openings 17.

The one-way inflatable outlet tube 13 of Example 3 and Example 4 are characterized by a minimum opening pressure to about 900 Pa, the pressure difference being measured over the valve for a gas flow of 16 cm$^3$/min.

The effect of disconnecting the valve region 2 from the rest of the flexible multilayer laminate 1 through which the inflatable outlet tube 13 is formed, having a large outlet opening 17 and capable of lifting up from the rest of the laminate, is clearly demonstrated. The large outlet opening 17 allows for packing of products characterized by important off-gassing flow rate such as for example ground coffee.

The low minimum opening pressure and the high output capacity obtained from the integrated, one-way pressure-release valve of the present invention avoids the deformation of the packaging and thus reduces and even prevents stress in the laminate.

The invention claimed is:

1. Flexible multilayer laminate (1) for forming a packaging of gas-releasing products, said laminate having an integrated pressure-release valve (2) having open and closed orientations and having a liquid film (12) disposed therein, the liquid film (12) optionally comprising spacer means, said flexible multilayer laminate comprising:

a laminate comprising a first oriented polymer layer (8) sealed on an underlying layer comprising a seal layer (6) by a first adhesive pattern (3) comprising first adhesive-free regions located on at least both sides of, or around at least one inlet perforation (11) and a second perforation-free oriented polymer layer (9) partly bonded to the first oriented polymer layer (8) via a second adhesive pattern (4), the first and second oriented polymer layers (8, 9) forming, once bonded in register, an inflatable outlet tube (13), said inflatable tube (13) being partially disconnected from the rest of said laminate by a surrounding outer score line (15) allowing the tube (13) to lift off from the first laminate under increased pressure in the pack; μm wherein the at least one inlet perforation (11) and the inflatable outlet tube (13) preferentially permit gaseous communication in one direction, the gas (14) entering through the at least one perforation (11), travelling through the liquid film (12) and exiting through the inflatable tube (13).

2. Flexible multilayer laminate according to claim 1, wherein the surrounding outer score line (15) is interrupted at least once at a location corresponding to the outlet opening(s) (17) of the inflatable outlet tube (13), and wherein an additional, interrupted score line (16) is provided adjacently parallel to the interrupted part of score line (15), the interruptions of both score lines being alternately positioned.

3. Flexible multilayer laminate according to claim 1, wherein the opening pressure of the pressure-release valve is lower the 5000 Pa, preferably lower than 3000 Pa, yet preferably lower than 2000 Pa, and most preferably lower than 1500 Pa or even less than 1000 Pa to achieve easy opening and high output of the valve.

4. Flexible multilayer laminate according to claim 1, wherein the second oriented polymer layer (9) is a patch (10), preferably a patch of a thickness of 60 μm or less, preferably of 50 μm or less, more preferably of 40 μm or less and most preferably of 30 μm or less, to avoid substantial local over-thicknesses on the reels of said flexible multilayer.

5. Flexible multilayer laminate according to claim 1, wherein the patch (10) comprises a barrier such as a metallized layer, an aluminum layer, a silicon oxide or aluminum oxide layer or an ethylene vinyl alcohol copolymer (EVOH) coating.

6. Flexible multilayer laminate according to claim 1, wherein the first (8) and second (9) oriented polymer layers are independently selected from the group consisting of oriented polyester, oriented polypropylene and oriented polyamide.

7. Flexible multilayer laminate according to claim 1, wherein the first (8) and/or second (9) oriented polymer layer(s) comprise(s) a barrier such as a metallized layer, an aluminum layer, a silicon oxide or aluminum oxide layer or an ethylene vinyl alcohol copolymer (EVOH) coating.

8. Flexible multilayer laminate according claim 1, wherein the liquid film (12) comprises a liquid selected from the group consisting of silicon oil, hydrocarbon oil, vegetable oil and water.

9. Flexible multilayer laminate according to claim 1, wherein spacer means comprise particles with an average particle size comprised between 10 and 60 μm, and preferably between 20 and 50 μm, and selected from the group consisting of powdered polymers, silica, carbon, carbon black and mixtures thereof.

10. Flexible multilayer laminate according to claim 1, wherein the off-gassing flow capacity of valve 2 is higher than 5 $cm^3$/min, preferably higher than 10 $cm^3$/min, more preferably higher than 15 $cm^3$/min, and most preferably higher than 20 $cm^3$/min.

11. Flexible multilayer laminate according to claim 1, wherein the liquid has a dynamic viscosity, at room temperature, comprised between 1 cP and 15000 cP, preferably between 500 cP and 1300 cP.

12. Method according to claim 11, wherein step h) comprises the partial separation of the second oriented polymer layer (9) from the surrounding multilayer laminate (1) by scoring means to form the inflatable outlet tube (13), when the second oriented polymer layer (9) is part of the initial multilayer laminate.

13. Method according to claim 11, wherein step f) comprises the addition of from 1 to 10% by weight, preferably from 3 to 7% by weight of spacer means concentrated at the location of the at least one perforation (11), the liquid (12) and the spacing means taken at 100% by weight.

14. Method for making the flexible multilayer laminate (1) of claim 1, said laminate having an integrated pressure-release valve (2), said method comprising the steps of:
  a) providing a first part of the laminate comprising a seal layer (6);
  b) applying a first adhesive pattern (3) on said first part of the laminate, said adhesive pattern comprising one or more adhesive-free regions (5) of various shapes;
  c) joining a first oriented polymer layer (8) to the first part of the laminate to form the second part of the laminate;
  d) perforating said second part of the laminate in the area surrounded by the adhesive-free region(s) (5);
  e) applying a second adhesive pattern (4) on the second part of the laminate;
  f) applying a liquid (12) on the second part of the laminate at the location surrounding the perforations;
  g) joining a second oriented polymer layer (9) to the first oriented polymer layer (8) by means of a second adhesive pattern (4);
  h) partly separating the first oriented polymer layer from the surrounding multilayer laminate by scoring means to form an inflatable outlet tube (13) when the second oriented polymer layer is a patch.

* * * * *